United States Patent
Dziuda et al.

(10) Patent No.: US 12,522,170 B2
(45) Date of Patent: Jan. 13, 2026

(54) COMPLIANT TRIGGER MECHANISM FOR ACTIVE HOOD SENSOR ACTIVATION

(71) Applicant: GM Global Technology Operations LLC, Detroit, MI (US)

(72) Inventors: Brandon Dziuda, Detroit, MI (US); Troy Kenneth Kleiner, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/634,467

(22) Filed: Apr. 12, 2024

(65) Prior Publication Data
US 2025/0319839 A1    Oct. 16, 2025

(51) Int. Cl.
*B60R 21/0136* (2006.01)
*B60R 21/34* (2011.01)
(Continued)

(52) U.S. Cl.
CPC .......... *B60R 21/38* (2013.01); *B60R 21/0136* (2013.01); *B62D 25/12* (2013.01); *B60R 2021/343* (2013.01)

(58) Field of Classification Search
CPC .................. B60R 21/01; B60R 21/013; B60R 21/0136; B60R 21/38; B60R 2021/343; B62D 25/10; B62D 25/105; B62D 25/12
(Continued)

(56) References Cited

U.S. PATENT DOCUMENTS

| | | | |
|---|---|---|---|
| 7,931,316 B2 * | 4/2011 | Takahashi | B60R 19/483 180/274 |
| 9,834,164 B1 * | 12/2017 | Iyer | B60R 21/38 |
| 12,391,202 B2 * | 8/2025 | Inamura | B60R 19/483 |

(Continued)

FOREIGN PATENT DOCUMENTS

| | | | | |
|---|---|---|---|---|
| CN | 104943641 A | * | 9/2015 | B60R 19/18 |
| CN | 108349453 A | * | 7/2018 | B60R 19/023 |

(Continued)

OTHER PUBLICATIONS

Description Translation for (JP 2019172154) from Espacenet (Year: 2019).*

(Continued)

*Primary Examiner* — Jason D Shanske
*Assistant Examiner* — Daniel M. Keck
(74) *Attorney, Agent, or Firm* — Honigman LLP; Matthew H. Szalach; Jonathan P. O'Brien (57) ABSTRACT

A vehicular front fascia system includes an active hood system and a vehicular front fascia. The front fascia includes an exterior body structure providing a leading surface of a vehicle equipped with the vehicular front fascia system, a compliant mechanism disposed interior of the exterior body structure of the vehicle, and a sensor tube disposed within a jaw portion of the compliant mechanism. The compliant mechanism includes an arm portion and the jaw portion. The arm portion is movable relative to the impact beam to impart a compression force at the jaw portion based on an impact at the exterior body structure. The sensor tube generates a signal indicative of the impact at the exterior body structure based on detection of the compression force at the jaw portion.

18 Claims, 5 Drawing Sheets

(51) Int. Cl.
*B60R 21/38* (2011.01)
*B62D 25/12* (2006.01)

(58) Field of Classification Search
USPC .................................................. 180/271, 274
See application file for complete search history.

(56) References Cited

U.S. PATENT DOCUMENTS

| | | | |
|---|---|---|---|
| 2004/0036261 A1* | 2/2004 | Breed ................. | B60R 21/0136 280/735 |
| 2019/0221056 A1* | 7/2019 | Hyde ................... | G01L 27/007 |
| 2019/0275971 A1* | 9/2019 | Stanek ................. | G01L 9/0026 |
| 2020/0276952 A1 | 9/2020 | Aizawa et al. | |
| 2022/0363216 A1* | 11/2022 | Akif ................... | B60R 21/0136 |
| 2023/0286456 A1* | 9/2023 | Inamura ................ | B60R 19/48 |

FOREIGN PATENT DOCUMENTS

| | | | | |
|---|---|---|---|---|
| DE | 102013018323 A1 | | 4/2015 | |
| JP | 2019172154 A | | 10/2019 | |
| KR | 100613778 B1 | * | 11/2006 | ............. B60R 21/38 |
| WO | WO-2019082286 A1 | | 5/2019 | |
| WO | WO-2019082287 A1 | | 5/2019 | |
| WO | WO-2019082288 A1 | | 5/2019 | |
| WO | WO-2019082289 A1 | | 5/2019 | |

OTHER PUBLICATIONS

Brigham Young University, "Compliant Mechanisms Explained," retrieved from the internet on Apr. 11, 2024 <https://compliantmechanisms.byu.edu/about-compliant-mechanisms>.

* cited by examiner

COMPLIANT TRIGGER MECHANISM FOR ACTIVE HOOD SENSOR ACTIVATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to an active hood system for a vehicle.

Active hood systems are incorporated into vehicles to protect pedestrians in the event of a low-speed impact. The purpose of an active hood system is to increase the amount of deformable space at a hood and front fascia area of the vehicle to absorb the impact of a pedestrian that contacts the front end of the vehicle. Larger vehicles, such as trucks and sport utility vehicles (SUV), benefit from a front fascia that is large enough to provide sufficient deformable space within the front fascia, thereby reducing the need for an active hood system. However, smaller vehicles such as sedans, sports cars, and coupes are often designed with aggressive styling at the front fascia, which generally results in a smaller front fascia that is low relative to the ground. Accordingly, for these types of smaller vehicles, an active hood system may be incorporated into the vehicle in an effort to increase the amount of deformable space, which provides protection to a pedestrian during a low-speed impact.

Active hood systems utilize sensors to detect an impact with an object proximate to the front fascia and will change properties of the hood when an impact is detected. For example, an active hood system may hinge the hood at an area proximate to a pivot point of the hood in an effort to create deformable space in an area underneath the hood. Creating deformable space allows the hood, as well as other components located near the front fascia, to more easily move and/or deform in response to an applied load. When the applied load is caused by a pedestrian making contact with the front fascia, the front fascia and related components are allowed to more easily move and/or deform, which gradually absorbs the energy associated with the applied load.

While conventional active hood systems mitigate the effects of a pedestrian contacting a hood of a vehicle, such systems restrict the design of the front fascia to ensure sensors associated with the active hood system are able to detect an applied load accurately and reliably. For example, active hood systems may require the front fascia to be formed from a material having a specific hardness and/or may require the front fascia to have a particular shape or profile. Such requirements, while ensuring proper functioning of the active hood system and related sensors, are often limiting from a design perspective.

SUMMARY

One aspect of the disclosure provides a vehicular front fascia. The vehicular front fascia includes an exterior body structure providing a leading surface of a vehicle equipped with the vehicular front fascia, a compliant mechanism disposed interior of the exterior body structure of the vehicle, and a sensor tube disposed within a jaw portion of the compliant mechanism. The compliant mechanism includes an arm portion and the jaw portion, the arm portion movable relative to the impact beam to impart a compression force at the jaw portion based on an impact at the exterior body structure. The sensor tube generates a signal indicative of the impact at the exterior body structure based on detection of the compression force at the jaw portion.

Implementations of the disclosure may include one or more of the following optional features. In some examples, an energy absorber is disposed between the exterior body structure and the impact beam of the vehicle, the energy absorber compressible between the exterior body structure and the impact beam based on the impact at the exterior body structure. In some further examples, the energy absorber includes at least one selected from the group consisting of (i) a foam energy absorber and (ii) a plastic energy absorber. In some even further examples, the compliant mechanism is integrally formed with the energy absorber.

In some implementations, the compliant mechanism spans a length of the impact beam.

In some aspects, the compliant mechanism spans only a portion of a length of the sensor tube.

In some examples, the leading surface of the vehicle is disposed at a height above a height of the impact beam of the vehicle.

In some implementations, the sensor tube is fixed relative to the impact beam.

In some aspects, the signal is transmitted to a front fascia system of the vehicle. In some further aspects, based on the signal from the sensor tube, the front fascia system activates an active hood system of the vehicle.

Another aspect of the disclosure provides a front fascia system. The front fascia system includes an active hood system and a vehicular front fascia. The vehicular front fascia includes an exterior body structure providing a leading surface of a vehicle equipped with the vehicular front fascia, a compliant mechanism disposed interior of the exterior body structure of the vehicle, and a sensor tube disposed within a jaw portion of the compliant mechanism. The compliant mechanism includes an arm portion and the jaw portion, the arm portion movable relative to the impact beam to impart a compression force at the jaw portion based on an impact at the exterior body structure. The sensor tube generates a signal that is indicative of the impact at the exterior body structure based on detection of the compression force at the jaw portion, the signal transferring to the front fascia system and activating the active hood system of the vehicle.

Implementations of this aspect of the disclosure may include one or more of the following optional features. In some examples, an energy absorber is disposed between the exterior body structure and the impact beam of the vehicle, the energy absorber compressible between the exterior body structure and the impact beam based on the impact at the exterior body structure.

In some implementations, the energy absorber includes at least one selected from the group consisting of (i) a foam energy absorber and (ii) a plastic energy absorber. In some further implementations, the compliant mechanism is integrally formed with the energy absorber.

In some aspects, the leading surface of the vehicle is disposed at a height above a height of the impact beam of the vehicle.

In some examples, the sensor tube is fixed relative to the impact beam.

Yet another aspect of the disclosure provides a vehicle. The vehicle includes a front fascia system. The front fascia system includes an active hood system and a vehicular front fascia. The vehicular front fascia includes an exterior body structure providing a leading surface of a vehicle equipped with the vehicular front fascia, a compliant mechanism disposed interior of the exterior body structure of the vehicle, and a sensor tube disposed within a jaw portion of the compliant mechanism. The compliant mechanism includes an arm portion and the jaw portion, the arm portion movable relative to the impact beam to impart a compression force at the jaw portion based on an impact at the exterior body structure. The sensor tube generates a signal that is indicative of the impact at the exterior body structure based on detection of the compression force at the jaw portion, the signal transferring to the front fascia system and activating the active hood system of the vehicle.

Implementations of this aspect of the disclosure may include one or more of the following optional features. In some examples, an energy absorber is disposed between the exterior body structure and the impact beam of the vehicle, the energy absorber compressible between the exterior body structure and the impact beam based on the impact at the exterior body structure, the energy absorber including at least one selected from the group consisting of (i) a foam energy absorber and (ii) a plastic energy absorber. In some further examples, the compliant mechanism is integrally formed with the energy absorber.

In some implementations, the leading surface of the vehicle is disposed at a height above a height of the impact beam of the vehicle and the sensor tube is fixed relative to the impact beam.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A front fascia system is included as a feature in many vehicles that works to mitigate damage and injury that may result due to a vehicle's front-end impact with a pedestrian. The damage and injury mitigation offered by the front fascia system applies to the vehicle itself, the vehicle's occupants, and the pedestrian that has been struck by the vehicle. For vehicles such as sports cars and sedans with aggressive styling at a front end, which generally includes angular front fascias and low profiles, many front fascia systems include an active hood system. The active hood system works to increase the amount of deformable space provided at the front end of the vehicle during an impact with a pedestrian to increase the amount of energy absorbed by the vehicle and ideally reduce the amount of injury sustained by the pedestrian. When the active hood system is activated, the hood hinges upward at a rear end of the hood, closest to a windshield of the vehicle, thereby creating additional deformable space at the front end of the vehicle. In so doing, the active hood system increases the amount of energy that may be absorbed by the vehicle during an impact with a pedestrian, which mitigates the effect of the impact on the pedestrian.

Figure 1:
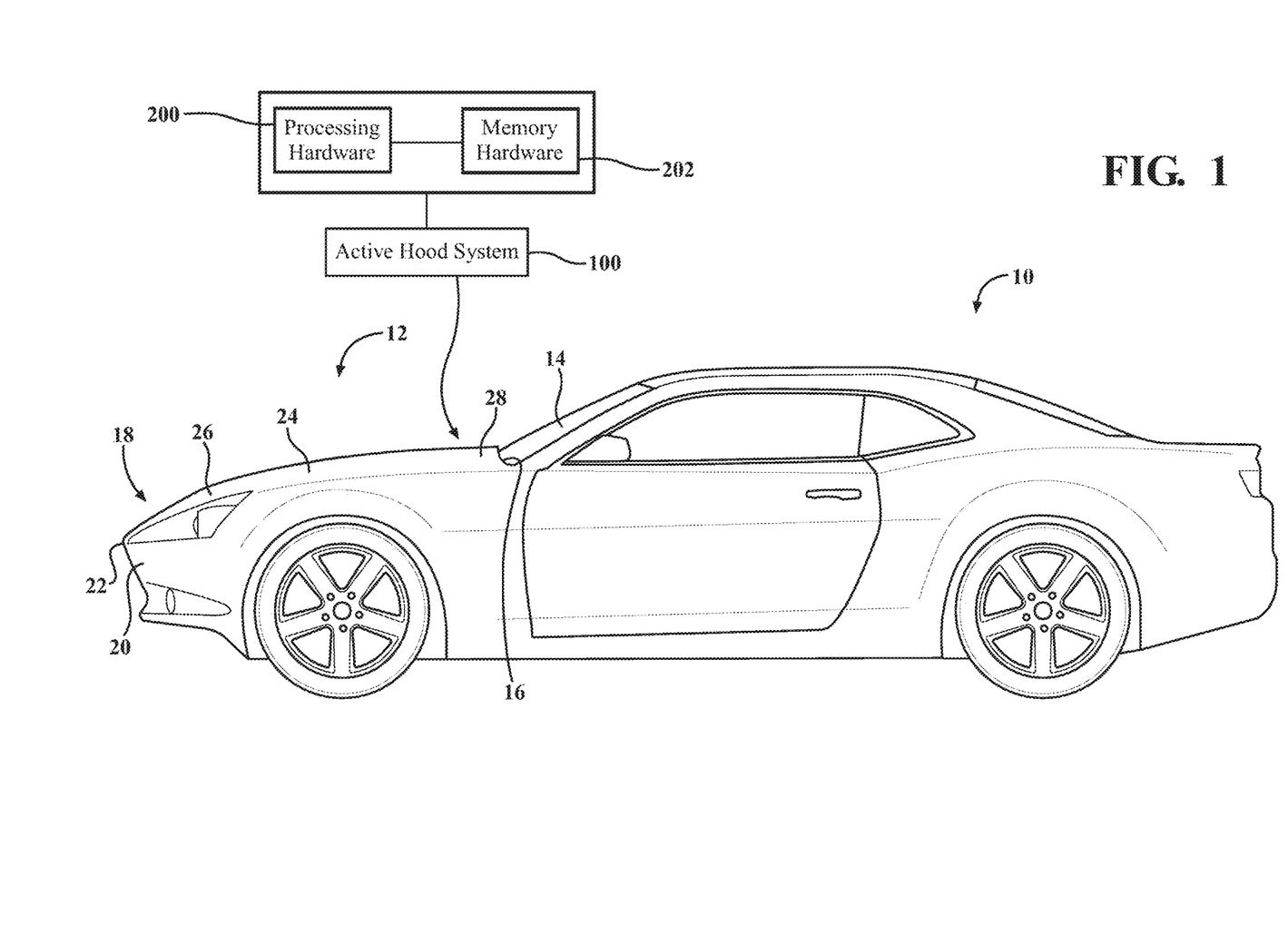
FIG. 1 is a side view of a vehicle.
Figure 2:
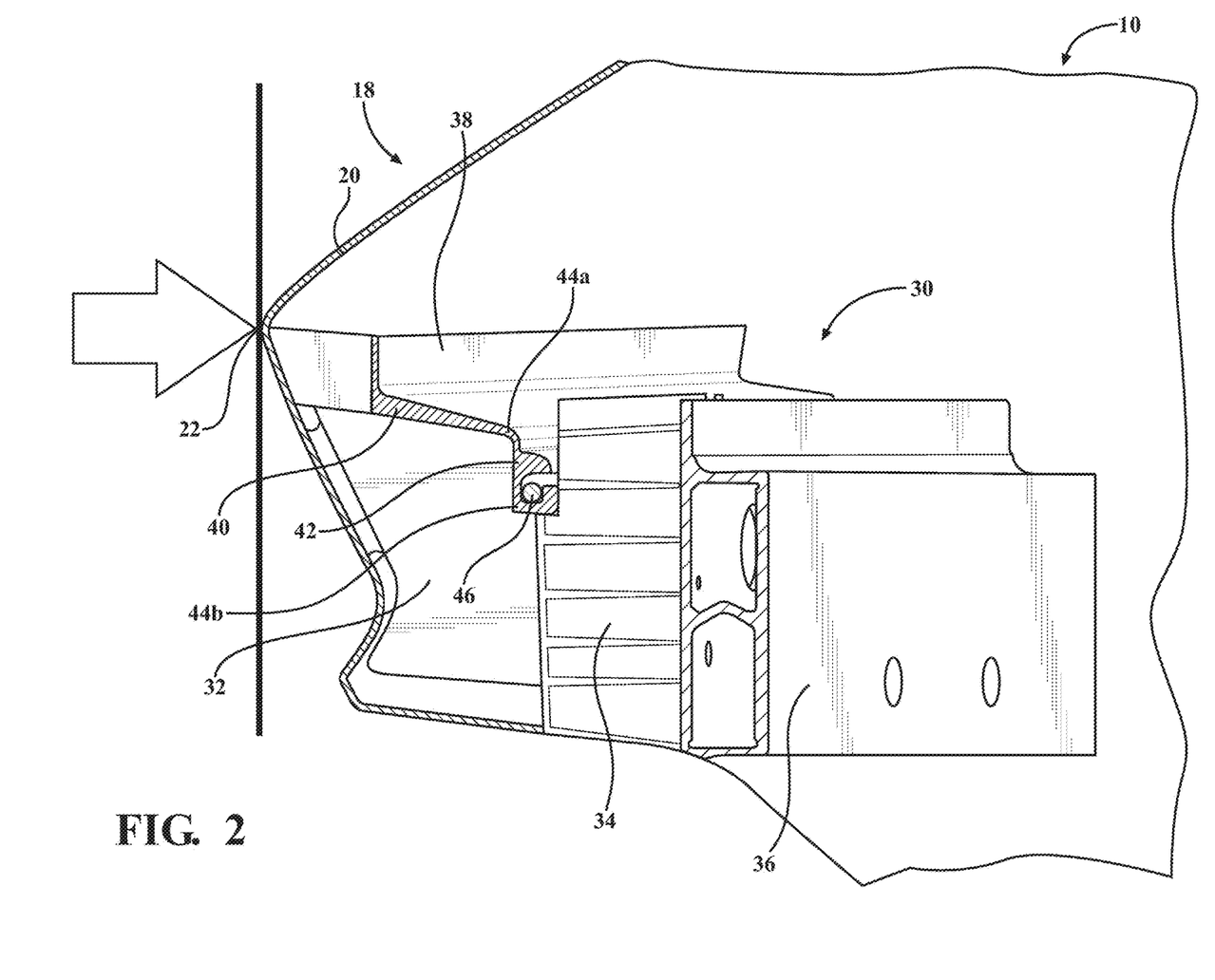
FIG. 2 is a cross-sectional view of a front fascia of the vehicle of FIG. 1, showing a leading edge of the front fascia.

With reference to FIGS. 1 and 2, a vehicle 10 is provided and includes a front portion 12 and a windshield 14 having a base 16. The front portion 12 includes the entirety of the vehicle 10 disposed forward from the base 16 of the windshield 14. The front portion 12 includes a front fascia 18 defining a front end of the vehicle 10. The front fascia 18 includes an exterior body 20 having an arcuate leading edge 22 defining a point that, in one configuration, may be located proximate to a ground surface due to the overall shape of the front portion 12. The hood 24 includes a forward edge 26 that is located proximate to the front fascia 18 of the vehicle 10, and a rearward edge 28 that is located proximate to the windshield 14 of the vehicle 10.

With reference to FIG. 2, the front portion 12 includes a cavity 30 positioned behind the exterior body 20 of the front fascia 18. A first energy absorber 32 is located within the cavity 30 and is shaped to generally match the shape of the exterior body 20. The first energy absorber 32 generally comprises a foam or foam-like material, however, it should be appreciated that the composition of the first energy absorber 32 may be any material capable of absorbing an impact of applied pressure. A second energy absorber 34 is also contained within the cavity 30 and is positioned rearward of the first energy absorber 32. The second energy absorber 34 generally comprises a plastic material, however, it should be appreciated that the composition of the second energy absorber 34 may be any material capable of absorbing an impact of applied pressure. Disposed rearward of the second energy absorber 34, within the cavity 30, is an impact beam 36 comprising a rigid material that is capable of both transferring a load of an impact at the front fascia 18 to other parts of the vehicle 10, and retaining structural integrity of the vehicle 10 during an impact.

Figure 3A:
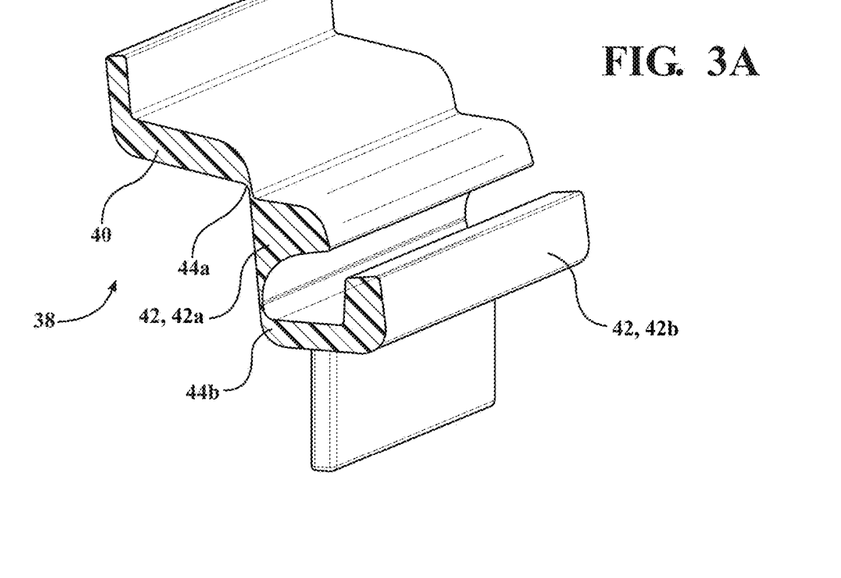
FIG. 3A is a perspective view of a compliant mechanism for an active hood system in accordance with the principles of the present disclosure.
Figure 3B:
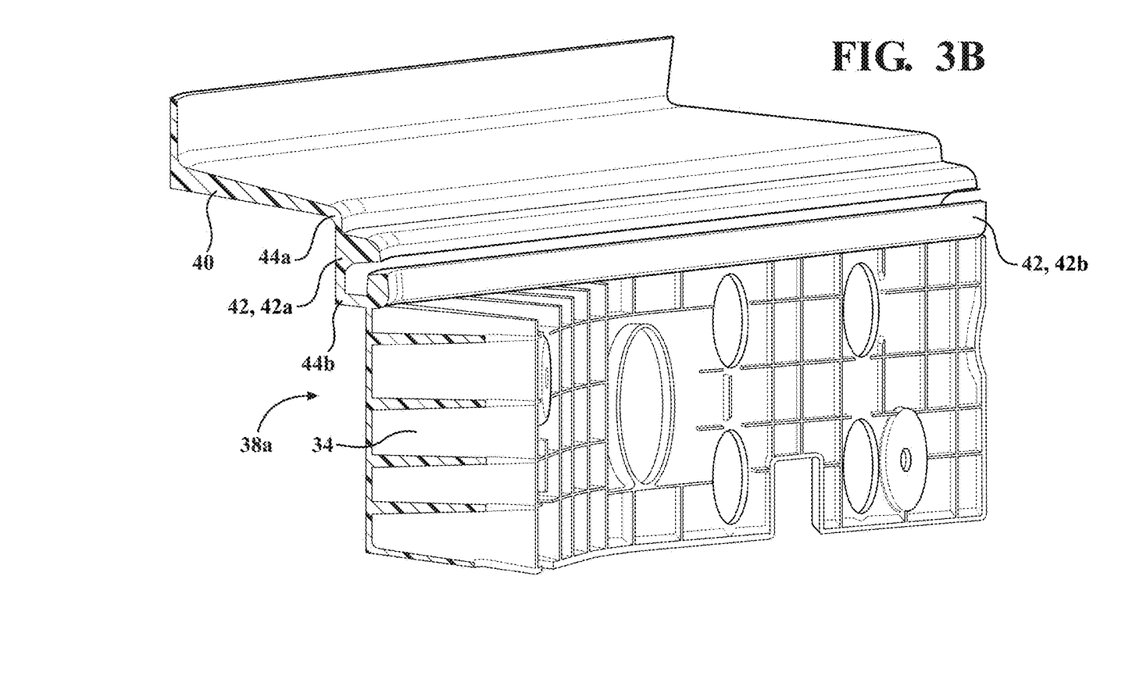
FIG. 3B is a perspective view of the compliant mechanism of FIG. 3A incorporated into energy absorption material of the active hood system.
Figure 4A:
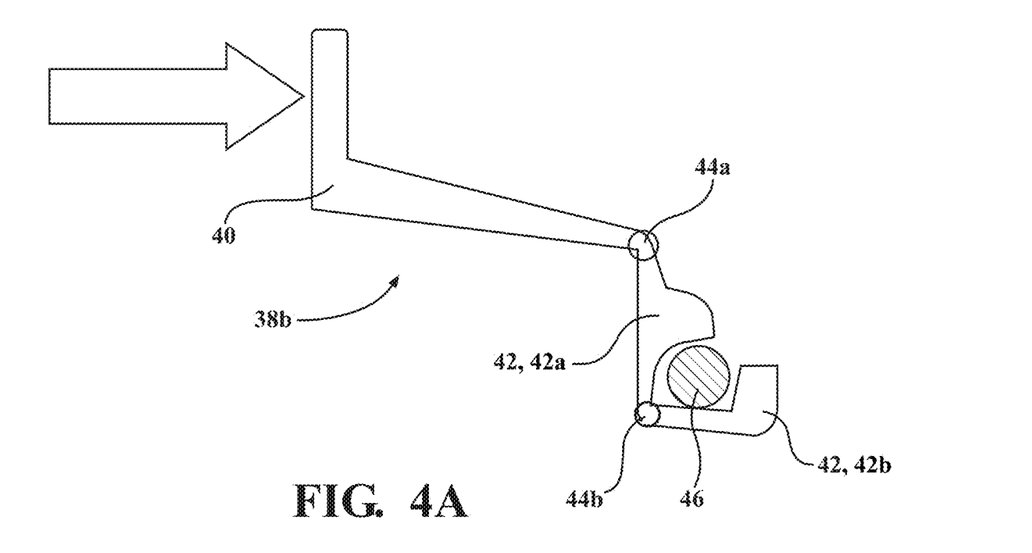
FIG. 4A is a diagram of the compliant mechanism of FIG. 3A in an unloaded state.
Figure 4B:
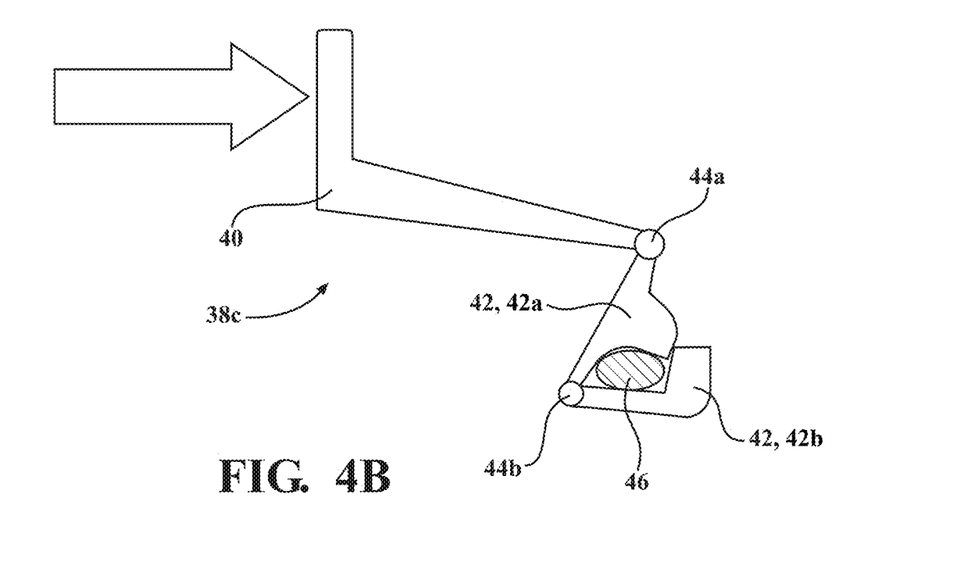
FIG. 4B is a diagram of the compliant mechanism of FIG. 3A in a loaded state.

With continued reference to FIGS. 1 and 2, and with reference to FIGS. 3A-4B, a compliant mechanism 38 is shown as being disposed within the cavity 30. The compliant mechanism 38 includes an arm portion 40 and a jaw portion 42 extending from the arm portion 40. As shown in FIG. 3A, the arm portion 40 is positioned forward of the jaw portion 42 within the cavity 30 such that the arm portion 40 is located closer to the fascia 18 than the jaw portion 42. The arm portion 40 is generally positioned at or near the first energy absorber 32, while the jaw portion 42 is generally positioned between the first energy absorber 32 and the second energy absorber 34. Furthermore, the arm portion 40 is positioned at a location directly or closely behind the leading edge 22 of the exterior body 20, such that an impact at the leading edge 22 is exerted on the arm portion 40. The compliant mechanism 38 comprises a relatively rigid material that incorporates one or more hinge points, such as a first hinge point 44a and a second hinge point 44b, that permit relative movement of the arm portion 40 and the jaw portion 42 when a force is applied to the compliant mechanism 38 at the arm portion 40. The jaw portion 42 includes a first jaw portion 42a and a second jaw portion 42b. The first jaw portion 42a is attached to the arm portion 40 at the first hinge point 44a and the second jaw portion 42b is attached to the first jaw portion 42a at the second hinge point 44b. The hinge points 44a, 44b comprise hinging capabilities due to the material at the hinge points 44a, 44b being of a lesser thickness compared to the rest of the compliant mechanism 38. As such, the hinge points 44a, 44b form living hinges that allow the material of the compliant mechanism 38—at the hinge points 44a, 44b—to either elastically or plastically deform. When a force is applied to the arm portion 40 and the hinge points 44a, 44b permit relative movement of the arm portion 40 and the jaw portion 42, the jaw portion 42 compresses as shown in FIG. 4B. For example, the first jaw portion 42a may rotate about the first hinge point 44a relative to the arm portion 40 and about the second hinge point 44b when the arm portion 40 is moved from the first position, or unloaded state (FIG. 4A), to the second position, or loaded state (FIG. 4B), to move the first jaw portion 42a toward the second jaw portion 42b.

As an option, rather than the compliant mechanism 38 being an independent element disposed in the cavity 30, an alternate compliant mechanism 38a may be incorporated into the first energy absorber 32, the second energy absorber 34, or both energy absorbers 32, 34 as a unitary piece, as shown in FIG. 3B. Forming the compliant mechanism 38a, the first energy absorber 32, and/or the second energy absorber 34 as a unitary piece may accommodate design constraints of the front portion 12 of the vehicle 10, as well as reduce the complexity of the components contained within the cavity 30. Whether the compliant mechanism 38 is an independent element or is formed integrally with the first energy absorber 32 and/or the second energy absorber 34, the function of the jaw portion 42 becoming compressed when a force is applied to the arm portion 40 remains unchanged.

A sensor tube 46 may be disposed within the jaw portion 42 of the compliant mechanism 38 and may detect applied pressure. In operation, when the sensor tube 46 detects an amount of applied pressure above a calibrated threshold, the sensor tube 46 sends a signal to activate an active hood system 100. The sensor tube 46 and the active hood system 100 may be in communication with processing hardware 200 and memory hardware 202 that are components of a standalone controller or are integrated into a controller of the vehicle 10 such as a body control module (BCM) (not shown). The processing hardware 200 and memory hardware 202 cooperate to control operation of the active hood system 100 in response to information from the sensor tube 46. Specifically, the memory hardware 202 may store instructions that when executed by the processing hardware 200 cause the processing hardware 200 to perform operations including activating the active hood system 100 when the sensor tube 46 detects an applied force above a predetermined threshold caused by the sensor tube 46 being compressed within the compliant mechanism 38. Specifically, when the sensor tube 46 detects a force of a predetermined magnitude, the processing hardware 200 may activate the active hood system 100 which, in one configuration, causes the hood 24 to pivot proximate to the rearward edge 28. In so doing, the size of the cavity 30 is effectively increased, thereby allowing the vehicle 10 to more easily absorb the energy associated with the applied force. As can be appreciated, allowing the vehicle 10 to absorb more energy associated with an applied load directs the energy away from a pedestrian when the applied load is caused by the pedestrian contacting the leading edge 22. As such, activating the active hood system 100 mitigates the effects of the pedestrian contacting the vehicle 10 at the leading edge 22 and protects the pedestrian.

With continued reference to FIGS. 4A-4B, the sensor tube 46 is sized to fit into the jaw portion 42 and experience little to no applied pressure when the compliant mechanism 38 is in an uncompressed state 38*b*. However, when the compliant mechanism 38 is in a compressed state 38*c*, the jaw portion 42 will compress an amount that applies pressure at the sensor tube 46 that is sufficient enough to trigger the active hood system 100.

Figure 5A:
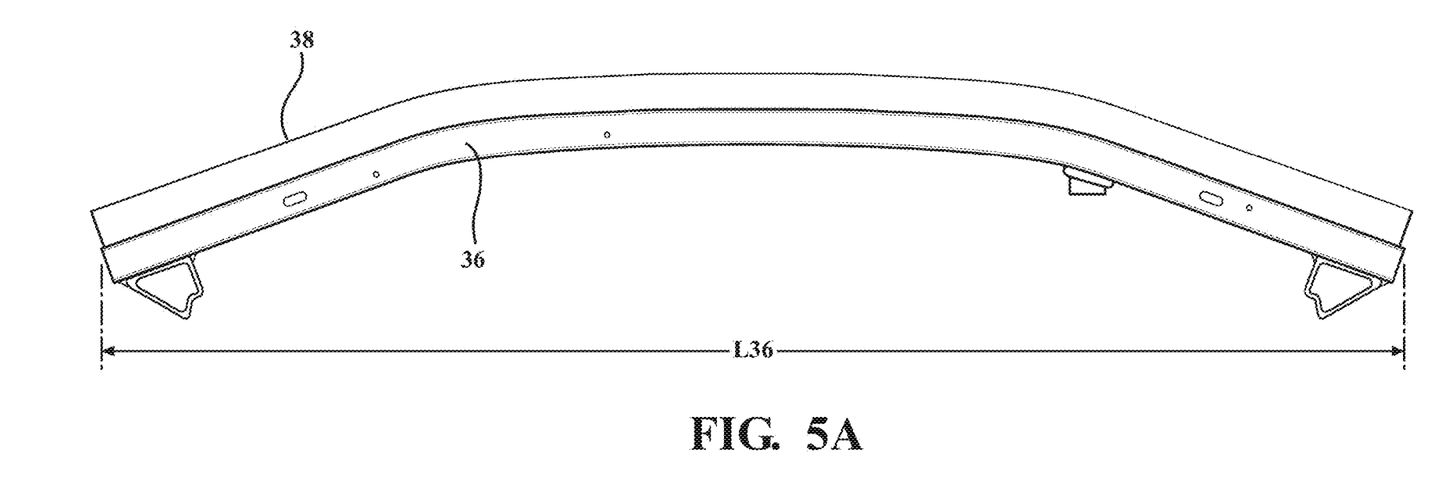
FIG. 5A is a top-side view of an impact beam with a compliant mechanism disposed across a length of the entire impact beam.
Figure 5B:
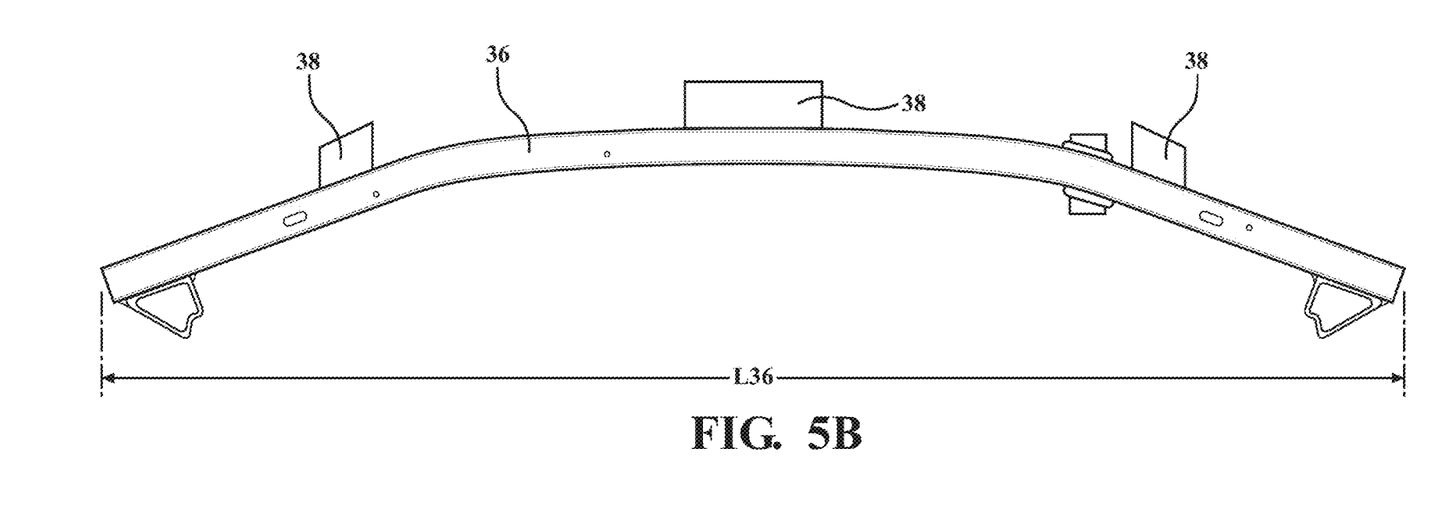
FIG. 5B is a top-side view of an impact beam with multiple compliant mechanisms disposed at various locations of the impact beam.

With reference to FIGS. 5A-5B, the placement of the compliant mechanism 38 within the cavity 30 may vary without compromising its function. While the sensor tube 46 may span a length L36 of the impact beam 36 that extends across the entirety of the front fascia 18, multiple compliant mechanisms 38 may be positioned at various locations across the impact beam 36. The sensor tube 46 is routed through each jaw portion 42 of every compliant mechanism 38 that is included in this specific configuration. Alternatively, a single compliant mechanism 38 that extends the entire length L36 of the impact beam 36 may be used. The compliant mechanism 38 in this configuration provides a continuous and uninterrupted arm portion 40 and jaw portion 42, wherein the sensor tube 46 is disposed in the continuous jaw portion 42. Considerations regarding which configuration may be included in the vehicle 10 may include space and design constraints of the front fascia 18.

In operation, and with reference once again to FIG. 2, the compliant mechanism 38 is positioned within the cavity 30 in a manner where the arm portion 40 is directly behind the leading edge 22 of the exterior body 20. During an impact at the front fascia 18 of the vehicle 10, it is the leading edge 22 that will experience the brunt of the impact, as the leading edge 22 is the most forward portion of the vehicle 10. Due to the varying exterior designs among different types of vehicles and, more particularly, the varying designs at the front fascia 18, the leading edge 22 may be angular as opposed to a flat, planar surface, offering little surface area at the leading edge 22. Furthermore, differing designs of the front fascia 18 among various vehicles may position the leading edge 22 above or below the impact beam 36. However, the compliant mechanism 38 may be utilized to allow virtually any design of the front fascia 18 to be used in conjunction with the sensor tube 46 to allow the sensor tube 46 to accurately and reliably detect an impact. Namely, provided the arm portion 40 is positioned directly behind the leading edge 22, and the jaw portion 42 is positioned in front of the impact beam 36 so the sensor tube 46 is fixed relative to the impact beam 36, the processing hardware 200 of the vehicle 10 can successfully activate the active hood system 100 in response to the sensor tube 46 experiencing a force of a predetermined magnitude.

Continuing with the operation of the disclosure, an example will be described in which the vehicle 10 collides with a pedestrian at the front fascia 18. During the collision, a majority of the force from the impact of the pedestrian will be applied at the leading edge 22, as the leading edge 22 is the most forward portion of the front fascia 18 and, thus, the vehicle 10. The force of the impact will be partially absorbed by both the first energy absorber 32 and the second energy absorber 34 that are disposed in the cavity 30, in front of the rigid impact beam 36. However, because most of the force is applied to the leading edge 22, much of the force from the impact will be transferred to the arm portion 40 of the compliant mechanism 38. The force at the arm portion 40 will cause hinging to occur at the hinge points 44*a*, 44*b*, which causes the jaw portion 42 of the compliant mechanism 38 to compress. As the jaw portion 42 compresses, the sensor tube 46 disposed in the jaw portion 42 will experience an increased amount of compression force. Once the sensor tube 46 experiences a compression force that is greater than the calibrated threshold, a signal will be sent to the processing hardware 200 which, in turn, will activate the active hood system 100. At this point, the active hood system 100 will immediately engage, which causes the hood 24 of the vehicle 10 to hinge at the forward edge 26, moving the rearward edge 28 upward. By hinging the hood 24 at the forward edge 26, thus moving the hood 24 upward at the rearward edge 28, an increased amount of deformable space is created, as the hinging of the hood 24 creates an increased gap between the hood 24 and the rest of the vehicle 10. The more deformable space provided by the vehicle 10 during an impact with a pedestrian, the greater the amount of force that can be absorbed by the vehicle 10 from the pedestrian. Creating additional deformable space is the main purpose of the active hood system 100, as providing an increased amount of deformable space offers better protection to the pedestrian during an impact with the front fascia 18.

The inclusion of the compliant mechanism 38 within the cavity 30 allows for a substantial increase in design flexibility at the exterior body 20 of the vehicle 10. As an example, the leading edge 22 does not have to be directly in front of the impact beam 36, as would be required with an active hood system that does not include a compliant mechanism 38. The leading edge 22 positioned above or below the impact beam 36 can still compress the sensor tube 46 sufficiently to activate the active hood system 100 during an impact at the leading edge 22 with the inclusion of the compliant mechanism 38. Because the force applied at the leading edge 22 during an impact is transferred to the arm portion 40, which compresses the jaw portion 42 and sufficiently applies pressure to the sensor tube 46 to activate the active hood system 100, the placement of the leading edge 22 on the front fascia 18 is not as restrictive compared to an active hood system without a compliant mechanism 38. Furthermore, the leading edge 22 can be shaped to correspond to the design considerations of the front portion 12 of the vehicle 10 without requiring the leading edge 22 to be a flat surface. A leading edge that does not offer much surface area may not sufficiently transfer force during an impact to a sensor tube in a vehicle that does not include a compliant mechanism. However, with the arm portion 40 of the compliant mechanism 38 disposed directly behind the leading edge 22, the surface area of the leading edge 22 can be reduced without sacrificing the amount of force received by the sensor tube 46 during an impact at the leading edge 22, thus increasing design flexibility.

Not only does the compliant mechanism 38 offer an increase in design flexibility at the exterior body 20, but the components within the cavity 30, and the cavity 30 itself, can be designed and arranged in a manner that does not need to consider whether the sensor tube 46 is properly positioned to compress upon force applied at the leading edge 22. The sensor tube 46 must be contained within the jaw portion 42 of the compliant mechanism 38, and the arm portion 40 must be disposed behind the leading edge 22 to properly function and activate the active hood system 100 upon impact at the leading edge 22. Additionally, the jaw portion 42 must be positioned in front of the impact beam 36. While the jaw portion 42 is not in direct contact with the impact beam 36, as the second energy absorber 34 is disposed between the jaw portion 42 and the impact beam 36, the rigidity of the impact beam 36 works to keep the jaw portion 42 of the compliant mechanism 38 fixed during an impact at the leading edge 22. If the jaw portion 42 was not fixed, an impact at the arm portion 40 would not cause the hinge points 44a, 44b to hinge but, rather, would cause the entire compliant mechanism 38 to simply shift as a result of the impact without any hinging action occurring. Fixing the jaw portion 42 at a location in front of the rigid impact beam 36 helps to allow the hinge points 44a, 44b, to hinge upon impact at the arm portion 40, thus compressing the jaw portion 42 and providing a sufficient amount of compression force at the sensor tube 46 to active the active hood system 100. Beyond these requirements, the components within the cavity 30, and the cavity 30 itself, can be designed and positioned in a manner that does not require consideration of the sensor tube 46 properly functioning during an impact event.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
   an exterior body structure defining a leading surface of the vehicle;
   an impact beam disposed interior to the exterior body structure and spaced apart from the exterior body structure;
   a compliant mechanism disposed between the exterior body structure and the impact beam and including an arm portion movable from a first position to a second position relative to the impact beam in response to an impact at the exterior body structure, a first jaw portion attached to the arm portion at a first hinge point, and a second jaw portion attached to the first jaw portion at a second hinge point, the first jaw portion rotating about the first hinge point relative to the arm portion and about the second hinge point when the arm portion is moved from the first position to the second position to move the first jaw portion toward the second jaw portion; and
   a sensor tube disposed between the first jaw portion and the second jaw portion, the sensor tube generating a signal indicative of the impact at the exterior body structure in response to compression of the sensor tube between the first jaw portion and the second jaw portion as the first jaw portion moves toward the second jaw portion in response to the arm portion moving from the first position to the second position.

2. The vehicle of claim 1, wherein an energy absorber is disposed between the exterior body structure and the impact beam, the energy absorber compressible between the exterior body structure and the impact beam based on the impact at the exterior body structure.

3. The vehicle of claim 2, wherein the energy absorber comprises at least one selected from the group consisting of (i) a foam energy absorber and (ii) a plastic energy absorber.

4. The vehicle of claim 3, wherein the compliant mechanism is integrally formed with the energy absorber.

5. The vehicle of claim 1, wherein the compliant mechanism spans a length of the impact beam.

6. The vehicle of claim 1, wherein the compliant mechanism spans only a portion of a length of the sensor tube.

7. The vehicle of claim 1, wherein the leading surface of is disposed at a height above a height of the impact beam.

8. The vehicle of claim 1, wherein the sensor tube is fixed relative to the impact beam.

9. The vehicle of claim 1, wherein the signal is transmitted to a controller of the vehicle.

10. The vehicle of claim 9, wherein, based on the signal from the sensor tube, the controller activates an active hood system of the vehicle.

11. A vehicle comprising:
    an exterior body structure defining a leading surface of the vehicle;
    an impact beam disposed interior to the exterior body structure and spaced apart from the exterior body structure;
    a compliant mechanism disposed between the exterior body structure and the impact beam and including an arm portion movable from a first position to a second position relative to the impact beam in response to an impact at the exterior body structure, a first jaw portion attached to a distal end of the arm portion at a first hinge point located at a first distal end of the first jaw portion, and a second jaw portion attached to the first jaw portion at a second hinge point located at a second distal end of the first jaw portion, the first jaw portion rotating about the first hinge point and the second hinge point to move the first jaw portion toward the second jaw portion when the arm portion is moved from the first position to the second position; and
    a sensor tube disposed between the first jaw portion and the second jaw portion, the sensor tube generating a signal that is indicative of the impact at the exterior body structure in response to compression of the sensor tube between the first jaw portion and the second jaw portion as the first jaw portion is moved toward the second jaw portion.

12. The vehicle of claim 11, wherein an energy absorber is disposed between the exterior body structure and the impact beam, the energy absorber compressible between the exterior body structure and the impact beam based on the impact at the exterior body structure.

13. The vehicle of claim 12, wherein the energy absorber comprises at least one selected from the group consisting of (i) a foam energy absorber and (ii) a plastic energy absorber.

14. The vehicle of claim 13, wherein the compliant mechanism is integrally formed with the energy absorber.

15. The vehicle of claim 11, wherein the leading surface is disposed at a height above a height of the impact beam.

16. The vehicle of claim 11, wherein the sensor tube is fixed relative to the impact beam.

17. The vehicle of claim 11, wherein the signal is transmitted to a controller of the vehicle.

18. The vehicle of claim 17, wherein, based on the signal from the sensor tube, the controller activates an active hood system of the vehicle.

\* \* \* \* \*